United States Patent
Laurenti et al.

(10) Patent No.: US 6,598,151 B1
(45) Date of Patent: Jul. 22, 2003

(54) STACK POINTER MANAGEMENT

(75) Inventors: Gilbert Laurenti, Saint Paul de Vence (FR); Walter A. Jackson, Pittsburgh, PA (US); Jack Rosenzweig, Pittsburgh, PA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/411,416

(22) Filed: Oct. 1, 1999

(30) Foreign Application Priority Data

Oct. 6, 1998 (EP) ............................................. 98402455
Mar. 8, 1999 (EP) ............................................. 99400556

(51) Int. Cl.⁷ .................................................. G06F 9/48
(52) U.S. Cl. ......................... 712/228; 712/227; 712/242
(58) Field of Search ................................ 712/227, 202, 712/242, 228, 209

(56) References Cited

U.S. PATENT DOCUMENTS 3,962,682 A * 6/1976 Bennett ........................ 712/230
4,674,032 A * 6/1987 Michaelson .................. 711/169
5,333,176 A * 7/1994 Burke et al. ................. 455/412

* cited by examiner

*Primary Examiner*—Richard L. Ellis
*Assistant Examiner*—Tonia L. Meonske
(74) *Attorney, Agent, or Firm*—Gerald E. Laws; W. James Brady, III; Frederick J. Telecky, Jr.

(57) ABSTRACT

A processor (100) is provided that is a programmable digital signal processor (DSP) with variable instruction length. A user stack region (910) is used to pass variables to a subroutine and to hold values representative of a first portion of a program counter (1000). A system stack region (911) is used to hold values representative of a remaining portion of the program counter (1001) and to hold additional context information. The user stack region and the system stack region are managed independently so that software from a prior generation processor can be translated to run on processor (100).

9 Claims, 10 Drawing Sheets

|          | $t_1$ | $t_2$ | $t_3$ | $t_4$ | $t_5$ | $t_6$ | $t_7$ | $t_8$ | $t_9$ | $t_{10}$ | $t_{11}$ |
|----------|-------|-------|-------|-------|-------|-------|-------|-------|-------|----------|----------|
|          | 202   | 204   | 206   | 208   | 210   | 212   | 214   |       |       |          |          |
| 302 INST 1 | $PF_1$ | $F_1$ | $D_1$ | $AD_1$ | $AC_1$ | $R_1$ | $E_1$ |   |       |          |          |
| 304 INST 2 |       | $PF_2$ | $F_2$ | $D_2$ | $AD_2$ | $AC_2$ | $R_2$ | $E_2$ |   |          |          |
| 306 INST 3 |       |       | $PF_3$ | $F_3$ | $D_3$ | $AD_3$ | $AC_3$ | $R_3$ | $E_3$ |          |          |
| 308 INST 4 |       |       |       | $PF_4$ | $F_4$ | $D_4$ | $AD_4$ | $AC_4$ | $R_4$ | $E_4$    |          |
| 310 INST 5 |       |       |       |       | $PF_5$ | $F_5$ | $D_5$ | $AD_5$ | $AC_5$ | $R_5$    |          |
| 312 INST 6 |       |       |       |       |       | $PF_6$ | $F_6$ | $D_6$ | $AD_6$ | $AC_6$   | $R_6$    |
| 314 INST 7 |       |       |       |       |       |       | $PF_7$ | $F_7$ | $D_7$ | $AD_7$   | $AC_7$   |

*FIG. 5*

| BYTE ADDRESS (HEX) | PROGRAM MEMORY (ADDRESSING VIA PROGRAM FETCH MECHANISM) | DATA MEMORY (ADDRESSING VIA DATA FETCH MECHANISM) | WORD ADDRESS (HEX) |
|---|---|---|---|
| 00 0000 |  | MMR | 00 0000 |
| 00 00C0 |  | MAIN DATA PAGE 0 | 00 0060 |
| 02 0000 |  | MMR | 01 0000 |
| 02 00C0 |  | MAIN DATA PAGE 1 | 01 0060 |
| FE 0000 |  | MMR | 7F 0000 |
| FE 00C0 |  | MAIN DATA PAGE 127 | 7F 0060 |
| FF FFFF |  |  | 7F FFFF |

*FIG. 7*

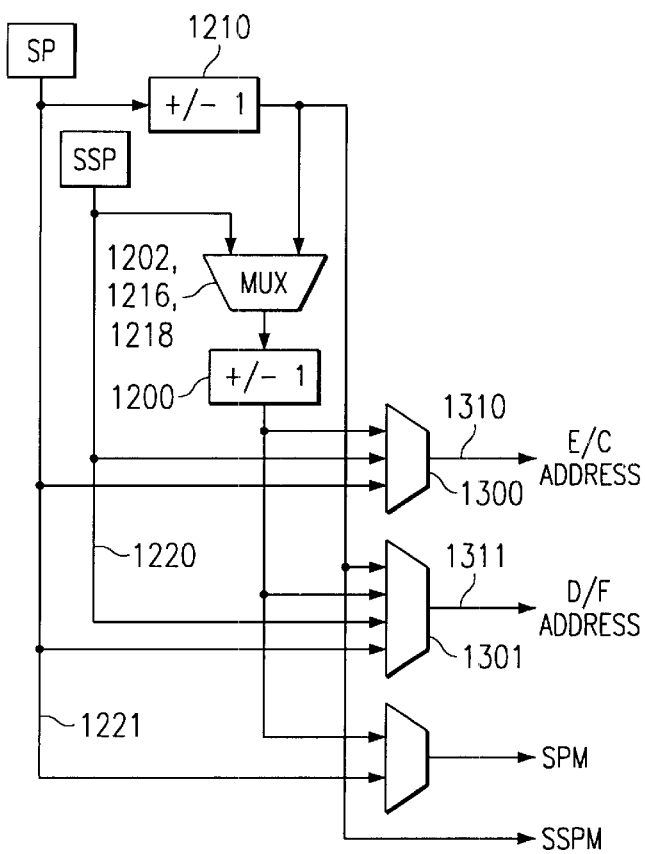
FIG. 13
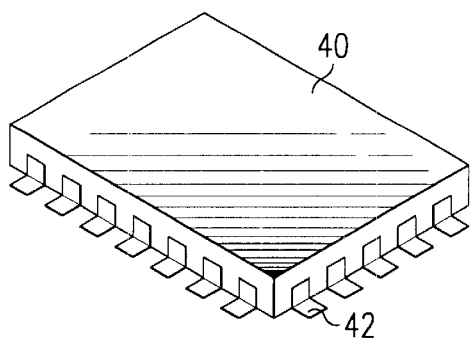
FIG. 16
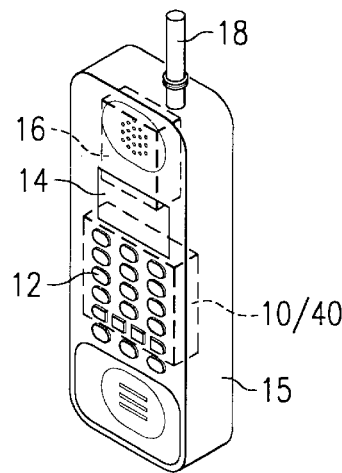
FIG. 17
| LCRPC (24-BIT) | RPT | RPTX | IRD | CONTEXT (5-BIT) |
|---|---|---|---|---|
| 30 | 7 | 6 | 5 | 3   0 |
| LEVEL | RPTB1 | RPTB2 | LOC1 | LOC2 | CODE |
|---|---|---|---|---|---|
| 0 | 0 | 0 | 0 | 0 | 0 |
| 1 | 0 | 0 | 0 | 0 | 1 |
| 1 | 1 | 0 | 0 | 0 | 2 |
| 1 | 1 | 0 | 1 | 0 | 3 |
| 2 | 0 | 0 | 0 | 0 | 4 |
| 2 | 0 | 1 | 0 | 0 | 5 |
| 2 | 0 | 1 | 0 | 1 | 6 |
| 2 | 1 | 1 | 0 | 0 | 7 |
| 2 | 1 | 1 | 0 | 1 | 8 |
| 2 | 1 | 1 | 1 | 1 | 9 |
FIG. 15

STACK POINTER MANAGEMENT

This application claims priority to Ser. No. 99400556.9, filed in Europe on Mar. 8, 1999 (TI-27760EU) and Ser. No. 98402455.4, filed in Europe on Oct. 6, 1998 (TI-28433EU).

FIELD OF THE INVENTION

The present invention relates to processors, and to management of a stack for passing variables during the execution of instructions in such processors.

Background of the Invention

Microprocessors are general purpose processors which require high instruction throughputs in order to execute software running thereon, and can have a wide range of processing requirements depending on the particular software applications involved. It is known to provide a stack that can be used to pass variables from one software routine to another. Stacks are also used to maintain the contents of the program counter when a first software routine calls a second software routine, so that program flow can return to the first software routine upon completion of the called second routine. A call within the second software routine can call a third routine, etc.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in, but not exclusively, applications such as mobile telecommunications applications, it is desirable to provide ever increasing DSP performance while keeping power consumption as low as possible.

One way of providing improved performance is to provide a larger instruction memory and to increase the length of the program counter so that the larger instruction memory can be directly addressed. However, this may result in program incompatibility between different generations of microprocessors.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. A program counter, which has a lower program counter portion and an upper program counter portion, provides an instruction address that is provided to the instruction memory. A first stack pointer is operable to address a first stack region in a data memory for saving a lower program counter value in response to an instruction, for example a CALL instruction, being executed by the microprocessor. A second stack pointer is operable to address a second stack region in the data memory for saving an upper program counter value in response to executing the CALL instruction. Advantageously, this preserves software code compatibility from an earlier generation microprocessor that passes variables via a stack.

In accordance with another aspect of the present invention, the data computation unit is operable to store a first variable value in the first stack region adjacent to the lower program counter value using a stack pointer relative address relative to the first stack pointer in response to executing another instruction, such as a PUSH instruction for example. Advantageously, the stack pointer relative address is not affected by the upper program counter value that is stored in the second stack region.

In accordance with another aspect of the present invention, a method of operating a digital system is provided. A plurality of instructions are executed in an improved processor core, wherein the instructions are fetched in response to a program counter from an instruction memory associated with the processor core. A first stack region is formed for holding a plurality of data values in a data memory associated with the processor core by maintaining a first stack pointer. A second stack region is formed separate from the first stack region in the data region for storing a second plurality of data values by maintaining a second stack pointer. A lower program counter value is stored in the first stack region in response to an instruction, such as a CALL, being executed in the data computation unit. A first upper program counter value is stored in the second stack region in response to executing the CALL instruction. A first argument value is then stored in the first stack region adjacent to the first lower program counter value using a stack pointer relative address relative to the first stack pointer in response to executing an instruction, such as a PUSH instruction for example. Advantageously, the stack pointer relative address is not affected by the upper program counter value that is stored in the second stack region, so that software code from a prior generation microprocessor can be easily ported to the improved microprocessor.

Another aspect of the present invention is that a context data value can be stored adjacent to the upper program counter value using a stack pointer relative address relative to the second stack pointer in response to executing the PUSH instruction. Advantageously, stack pointer relative addressing in the first stack region is not affected by the context data value that is stored in the second stack region. Thus, software code compatibility can be maintained while saving additional context information for added functionality.

BRIEF DESCRIPTION OF THE DRAWINGS

Particular embodiments in accordance with the invention will now be described, by way of example only, and with reference to the accompanying drawings in which like reference signs are used to denote like parts and in which the Figures relate to the processor of FIG. 1, unless otherwise stated, and in which:

FIG. 5 is a schematic representation of the core of the processor for explaining the operation of the pipeline of the processor;

FIG. 7 shows the unified structure of Program and Data memory spaces of the processor;

FIG. 13 is a block diagram illustrating circuitry for providing the stack pointer and the system stack pointer simultaneously to two data busses for dual read or write transactions;

FIG. 15 is a chart illustrating context data that is stored in the system stack;

FIG. 16 is a schematic representation of an integrated circuit incorporating the processor; and FIG. 17 is a schematic representation of a telecommunications device incorporating the processor of FIG. 1.

DESCRIPTION OF PARTICULAR EMBODIMENTS

Although the invention finds particular application to Digital Signal Processors (DSPs), implemented, for example, in an Application Specific Integrated Circuit (ASIC), it also finds application to other forms of processors.

The basic architecture of an example of a processor according to the invention will now be described. Processor 100 is a programmable fixed point DSP core with variable instruction length (8 bits to 48 bits) offering both high code density and easy programming. Architecture and instruction set are optimized for low power consumption and high efficiency execution of DSP algorithms as well as pure control tasks, such as for wireless telephones, for example. Processor 100 includes emulation and code debugging facilities.

Figure 1:
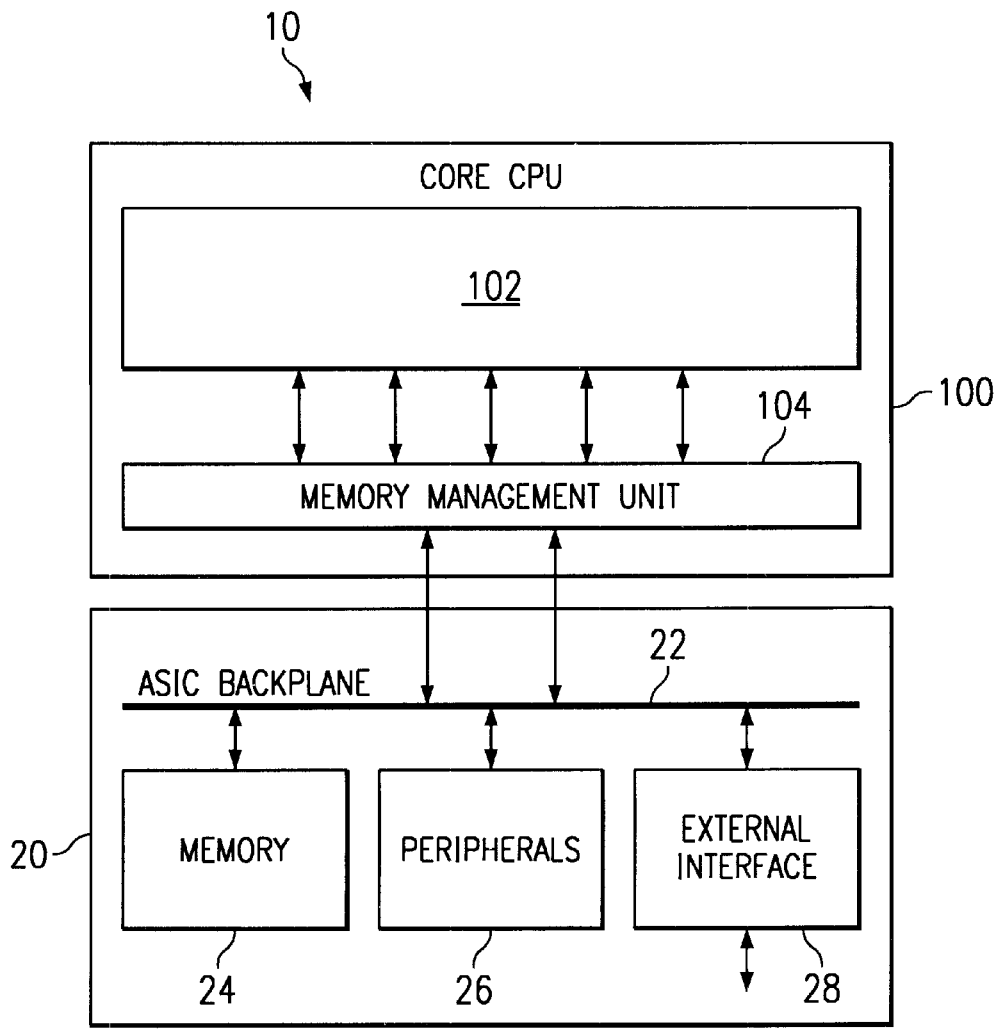
FIG. 1 is a schematic block diagram of a processor in accordance with an embodiment of the invention.

FIG. 1 is a schematic overview of a digital system 10 in accordance with an embodiment of the present invention. The digital system includes a processor 100 and a processor backplane 20. In a particular example of the invention, the digital system is a Digital Signal Processor System 10 implemented in an Application Specific Integrated Circuit (ASIC). In the interest of clarity, FIG. 1 only shows those portions of microprocessor 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 100 relevant to an embodiment of the present invention are explained in sufficient detail herein below, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 (TI-28433), which is incorporated herein by reference.

As shown in FIG. 1, processor 100 forms a central processing unit (CPU) with a processor core 102 and a memory interface unit 104 for interfacing the processor core 102 with memory units external to the processor core 102.

Processor backplane 20 comprises a backplane bus 22, to which the memory management unit 104 of the processor is connected. Also connected to the backplane bus 22 is an instruction cache memory 24, peripheral devices 26 and an external interface 28.

It will be appreciated that in other examples, the invention could be implemented using different configurations and/or different technologies. For example, processor 100 could form a first integrated circuit, with the processor backplane 20 being separate therefrom. Processor 100 could, for example be a DSP separate from and mounted on a backplane 20 supporting a backplane bus 22, peripheral and external interfaces. The processor 100 could, for example, be a microprocessor rather than a DSP and could be implemented in technologies other than ASIC technology. The processor or a processor including the processor could be implemented in one or more integrated circuits.

Figure 2:
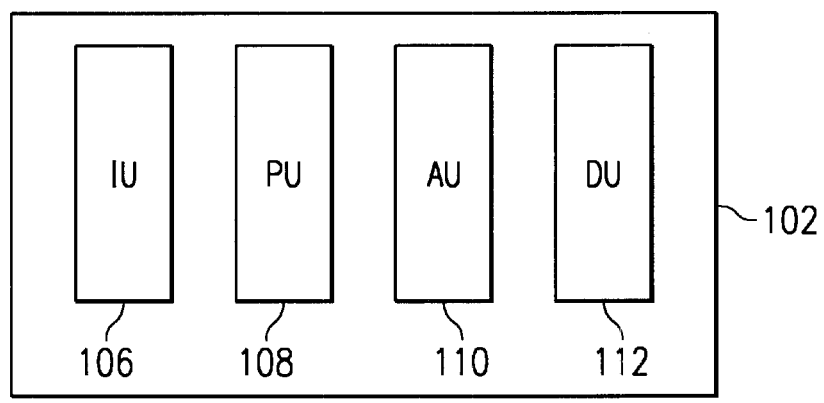
FIG. 2 is a schematic diagram of a core of the processor of FIG. 1.

FIG. 2 illustrates the basic structure of an embodiment of the processor core 102. As illustrated, this embodiment of the processor core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
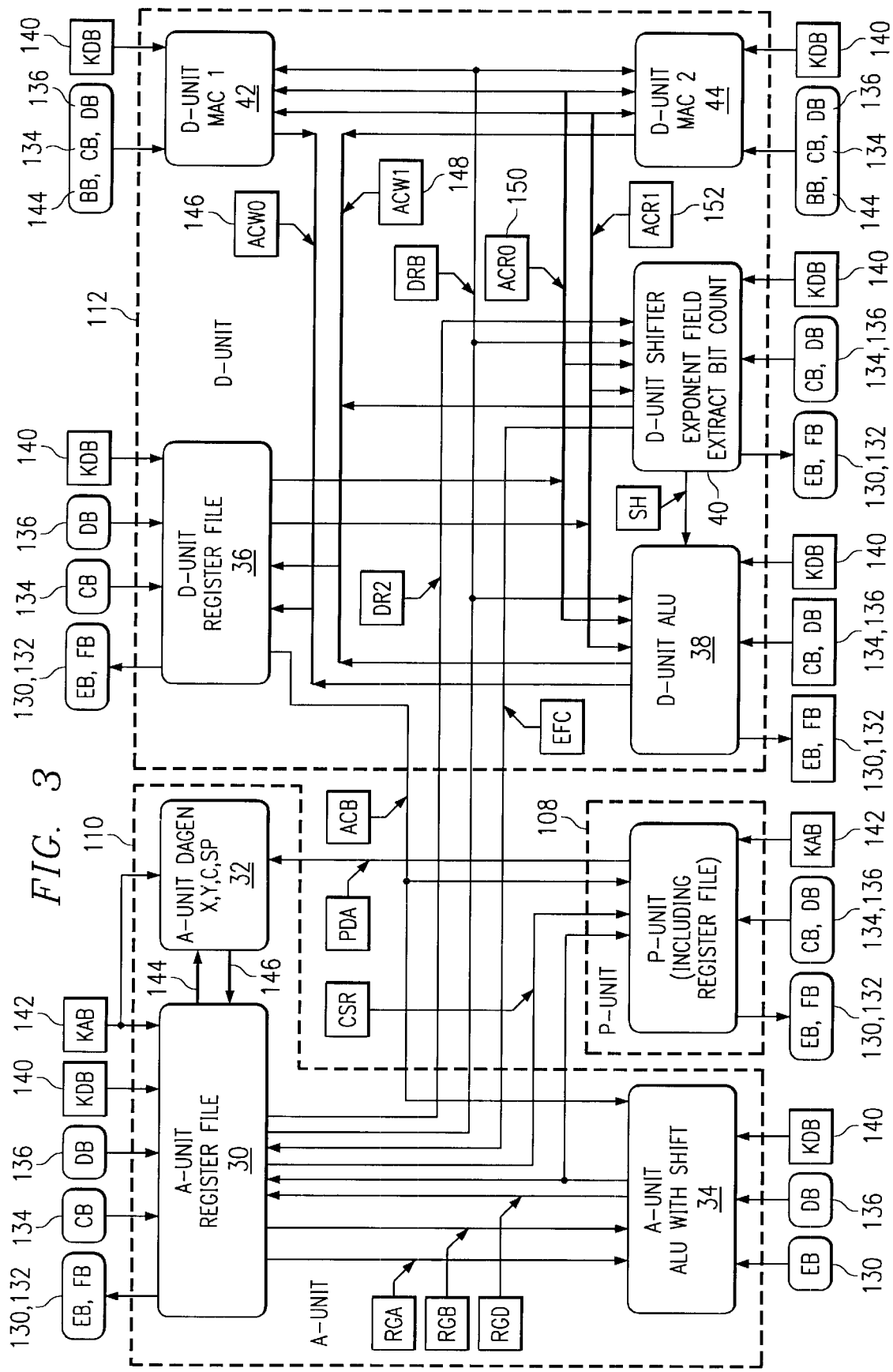
FIG. 3 is a more detailed schematic block diagram of various execution units of the core of the processor.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB)

134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0-DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose buses (EB,DB) 130,136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by buses RGA and RGB for receiving address and data register contents and by a bus RGD for forwarding address and data registers in the register file 30.

In accordance with the illustrated embodiment of the invention, D Unit 112 includes a D Unit register file 36, a D Unit ALU 38, a D Unit shifter 40 and two multiply and accumulate units (MAC1,MAC2) 42 and 44. The D Unit register file 36, D Unit ALU 38 and D Unit shifter 40 are coupled to buses (EB,FB,CB,DB and KDB) 130, 132, 134, 136 and 140, and the MAC units 42 and 44 are coupled to the buses (CB,DB, KDB) 134, 136, 140 and Data Read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write buses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read buses (ACR0, ACR1) 150, 152. The D Unit ALU 38 and D Unit shifter 40 are also coupled to sub-units of the A Unit 108 via various buses labeled EFC, DRB, DR2 and ACB.

Figure 4:
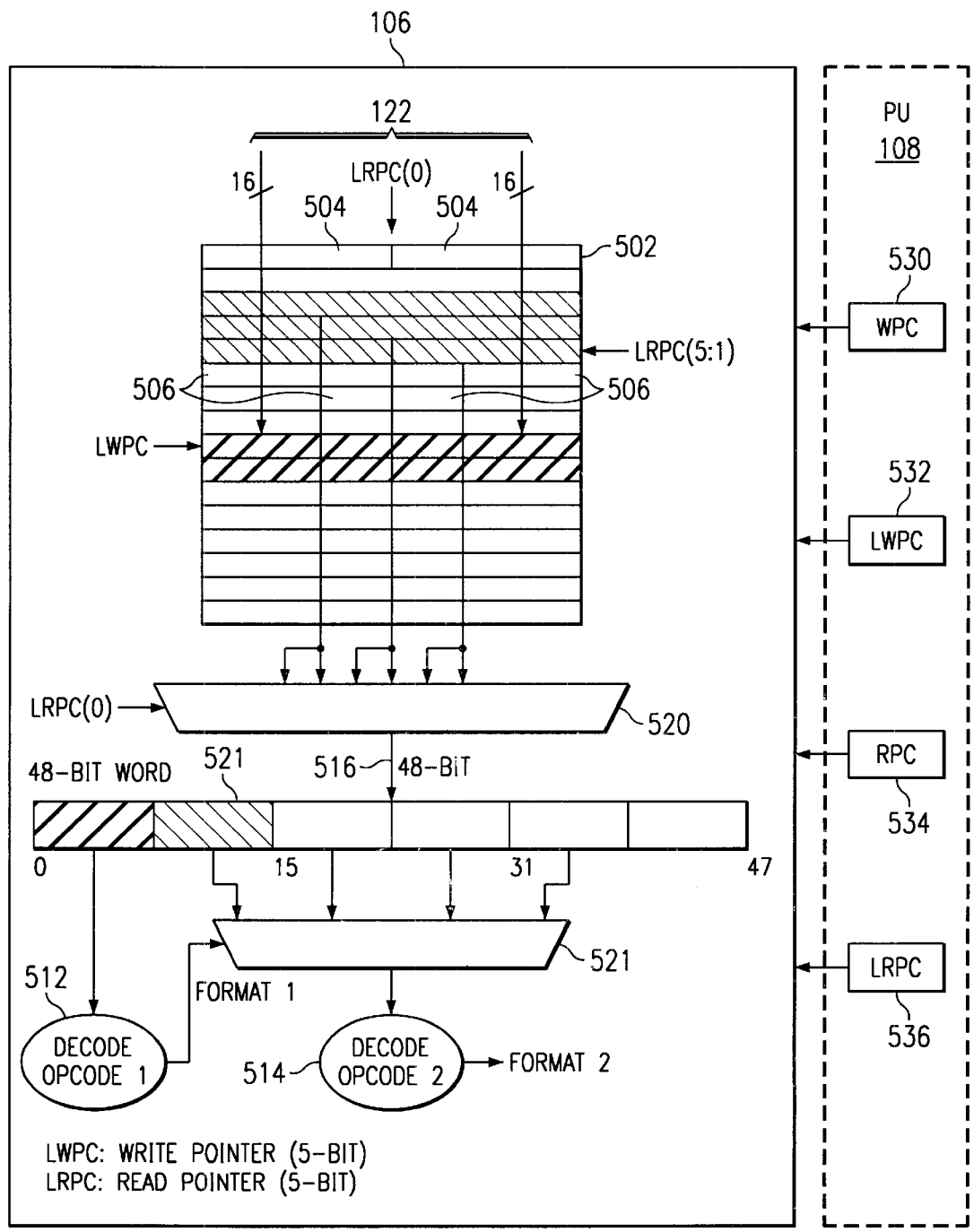
FIG. 4 is a schematic diagram of an instruction buffer queue and an instruction decoder of the processor.

Referring now to FIG. 4, there is illustrated an instruction buffer unit 106 in accordance with the present embodiment, comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoders 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder/s 512/514.

In this embodiment, the instructions are formed into a 48 bit word and are loaded into the instruction decoders 512, 514 over a 48 bit bus 516 via multiplexors 520 and 521. It will be apparent to a person of ordinary skill in the art that, the instructions may be formed into words comprising other than 48-bits, and that the present invention is not to be limited to the specific embodiment described above.

For presently preferred 48-bit word size, bus 516 can load a maximum of 2 instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decode thereof. The multiplexing associated with the alignment of instructions with byte boundaries is performed in multiplexors 520 and 521.

Processor core 102 executes instructions through a 7 stage pipeline, the respective stages of which will now be described with reference to Table 1 and to FIG. 5. The processor instructions are executed through a 7 stage pipeline regardless of where the execution takes place (A unit or D unit). In order to reduce program code size, a C compiler, according to one aspect of the present invention, dispatches as many instructions as possible for execution in the A unit, so that the D unit can be switched off to conserve power. This requires the A unit to support basic operations performed on memory operands.

TABLE 1 the Processor Pipeline Description for a
Single Cycle Instruction With No Memory Wait States

| Pipeline stage | | Description. |
|---|---|---|
| P0 | Pre-Fetch | Address program memory via the program address bus PAB. |
| P1 | Fetch | Read program memory through the program bus PB. Fill instruction buffer queue with the 4 bytes fetched in program memory. |
| P2 | Decode | Read instruction buffer queue (6 bytes) Decode instruction pair or single instruction. Dispatch instructions on Program Flow Unit (PU), Address Data Flow Unit (AU), and Data Computation Unit (DU). |
| P3 | Address | Data address computation performed in the 3 address generators located in AU: |
| | | Pre-computation of address to be generated in: |

TABLE 1-continued the Processor Pipeline Description for a Single Cycle Instruction With No Memory Wait States

| Pipeline stage | | Description. |
|---|---|---|
| | | direct SP/DP relative addressing mode. |
| | | indirect addressing mode via pointer registers. |
| | | Post-computation on pointer registers in: |
| | | indirect addressing mode via pointer registers. |
| | | Program address computation for PC relative branching instructions: goto, call, switch. |
| P4 | Access | Read memory operand address generation on BAB, CAB, DAB buses. |
| | | Read memory operand on CB bus (Ymem operand). |
| P5 | Read | Read memory operand on DB (Smem, Xmem operand), on CB and DB buses (Lmem operand), on BB (coeff operand). |
| | | Write memory operand address generation on EAB and FAB buses. |
| P6 | Execute | Execute phase of data processing instructions executed in A unit and D unit. |
| | | Write on FB bus (Ymem operand). |
| | | Write Memory operand on EB (Smem, Xmem operand), on EB and FB buses (Lmem operand). |

The first stage of the pipeline is a PRE-FETCH (P0) stage 202, during which stage a next program memory location is addressed by asserting an address on the address bus (PAB) 118 of a memory interface 104.

In the next stage, FETCH (P1) stage 204, the program memory is read and the I Unit 106 is filled via the PB bus 122 from the memory interface unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in A Unit 110 or P Unit 108 respectively.

In an ACCESS (P4) stage 210, the address of a read operand is generated and the memory operand, the address of which has been generated in a DAGEN Y operator with a Ymem indirect addressing mode, is then READ from indirectly addressed Y memory (Ymem).

The next stage of the pipeline is the READ (P5) stage 212 in which a memory operand, the address of which has been generated in a DAGEN X operator with an Xmem indirect addressing mode or in a DAGEN C operator with coefficient address mode, is READ. The address of the memory location to which the result of the instruction is to be written is generated.

Finally, there is an execution EXEC (P6) stage 214 in which the instruction is executed in either the A Unit 110 or the D Unit 112. The result is then stored in a data register or accumulator, or written to memory for Read/Modify/Write instructions. Additionally, shift operations are performed on data in accumulators during the EXEC stage.

Processor 100's pipeline is protected. This significantly improves the C compiler performance since no NOP's instructions have to be inserted to meet latency requirements. It also makes the code translation from a prior generation processor to a latter generation processor much easier.

A pipeline protection basic rule used in processor 100 is as follows: If a write access has been initiated before the on going read access but not yet completed and if both accesses share the same resource then extra cycles are inserted to allow the write completion and execute next instruction with the updated operands; but for emulation, a single step code execution must behave exactly as free running code execution.

The basic principle of operation for a pipeline processor will now be described with reference to FIG. 5. As can be seen from FIG. 5, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 5 for a seven stage pipeline a total of 7 instructions may be processed simultaneously. For all 7 instructions 302, 304, 306, 308, 310, 312, 314. FIG. 5 shows them all under process in time period $T_7$. Such a structure adds a form of parallelism to the processing of instructions.

Figure 6:
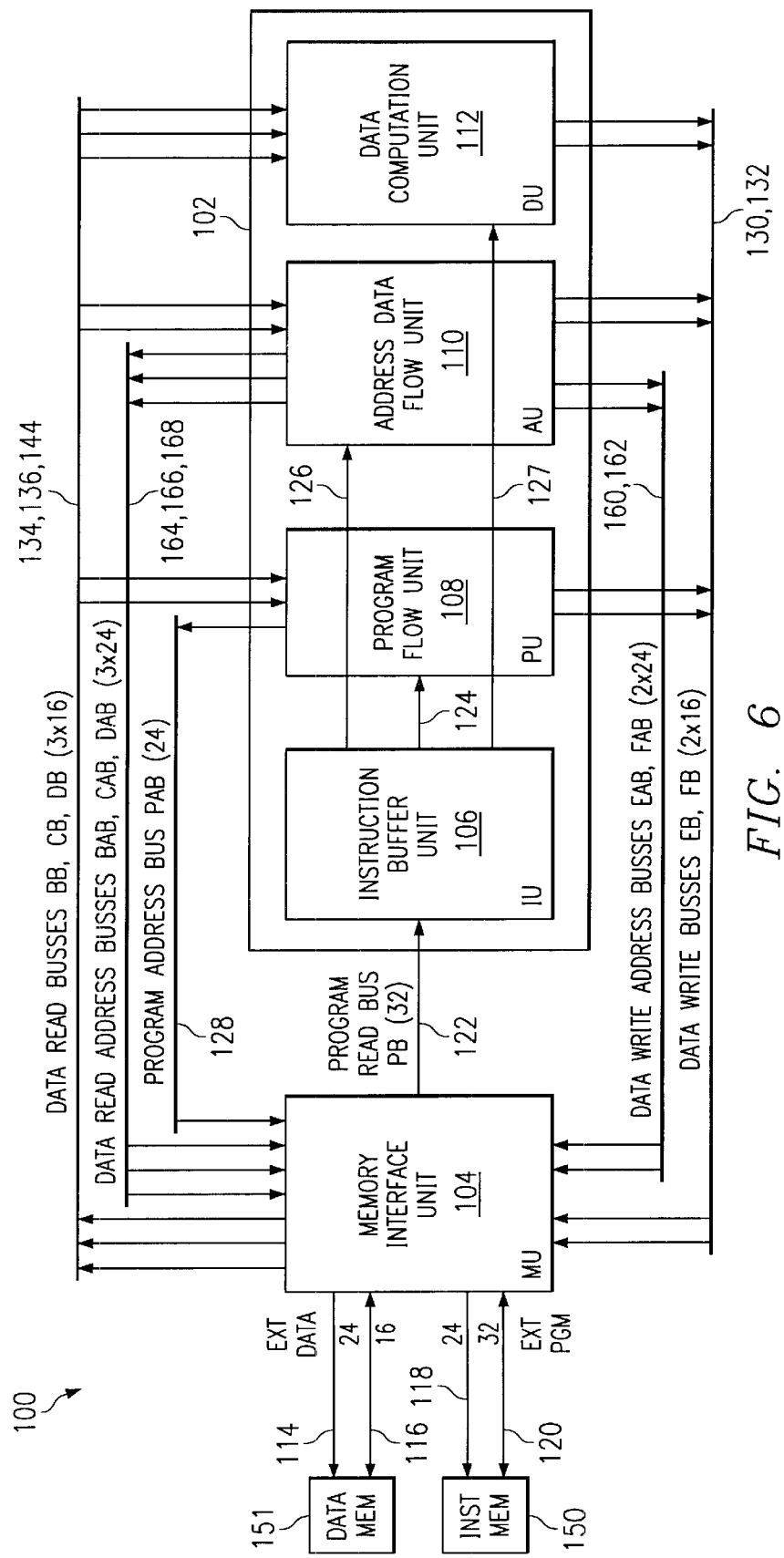
FIG. 6 is a block diagram of the processor illustrating a memory management unit interconnected memory.

As shown in FIG. 6, the present embodiment of the invention includes a memory interface unit 104 which is coupled to external program storage memory 150 via a 24 bit address bus 118 and a 32 bit bidirectional data bus 120. Additionally, the memory interface unit 104 is coupled to data memory units 151 via a 24 bit address bus 114 and a bi-directional 16 bit data bus 116. The memory interface unit 104 is also coupled to the I Unit 106 of the machine processor core 102 via a 32 bit program read bus (PB) 122. The P Unit 108, A Unit 110 and D Unit 112 are coupled to the memory interface unit 104 via data read and data write buses and corresponding address buses. The P Unit 108 is further coupled to a program address bus 128.

More particularly, the P Unit 108 is coupled to the memory interface unit 104 by a 24 bit program address bus 128, the two 16 bit data write buses (EB, FB) 130, 132, and the two 16 bit data read buses (CB, DB) 134, 136. The A Unit 110 is coupled to the memory interface unit 104 via two 24 bit data write address buses (EAB, FAB) 160, 162, the two 16 bit data write buses (EB, FB) 130, 132, the three data read address buses (BAB, CAB, DAB) 164, 166, 168 and the two 16 bit data read buses (CB, DB) 134, 136. The D Unit 112 is coupled to the memory interface unit 104 via the two data write buses (EB, FB) 130, 132 and three data read buses (BB, CB, DB) 144, 134, 136.

FIG. 6 represents the passing of instructions from the I Unit 106 to the P Unit 108 at 124, for forwarding branch instructions for example. Additionally, FIG. 6 represents the passing of data from the I Unit 106 to the A Unit 110 and the D Unit 112 at 126 and 127 respectively.

Processor 100 is organized around a unified program/data space, as illustrated in FIG. 7. A program pointer is internally 24 bits and has byte addressing capability, but only a 22 bit address is exported to memory since program fetch is always performed on a 32 bit boundary. However, during emulation for software development, for example, the full 24 bit address is provided for hardware breakpoint implementation. Data pointers are 16 bit extended by a 7 bit main data page and have word addressing capability.

Software can define up to 3 main data pages, as follows:

| MDP | Direct access | Indirect access | CDP |
|---|---|---|---|
| MDP05 | — | Indirect access | AR[0–5] |
| MDP67 | — | Indirect access | AR[6–7] |

A stack is maintained and always resides on main data page 0. CPU memory mapped registers are visible from all the pages.

Various aspects of processor 100 are summarized in Table 2.

TABLE 2

Summary of Improved Processor 100

Very Low Power programmable processor
Parallel execution of instructions, 8-bit to 48-bit instruction format
Seven stage pipeline (including pre-fetch)

| Instruction buffer unit highlight | 32 × 16 buffer size<br>Parallel Instruction dispatching<br>Local Loop |
|---|---|
| Data computation unit highlight | Four 40 bit generic (accumulator) registers<br>Single cycle 17 × 17 Multiplication-Accumulation (MAC)<br>40 bit ALU, "32 + 8" or "(2 × 16) + 8"<br>Special processing hardware for Viterbi functions<br>Barrel shifter |
| Program flow unit highlight | 32 bits/cycle program fetch bandwidth<br>24 bit program address<br>Hardware loop controllers (zero overhead loops)<br>Interruptible repeat loop function<br>Bit field test for conditional jump<br>Reduced overhead for program flow control |
| Data flow unit highlight | Three address generators, with new addressing modes<br>Three 7 bit main data page registers<br>Two Index registers<br>Eight 16 bit pointers<br>Dedicated 16 bit coefficients pointer<br>Four 16 bit generic registers<br>Three independent circular buffers<br>Pointers & registers swap<br>16 bits ALU with shift |
| Memory Interface highlight | Three 16 bit operands per cycle<br>32 bit program fetch per cycle<br>Easy interface with cache memories |

C compiler
Algebraic assembler

An aspect of the present invention is to preserve software code compatibility between an earlier version of a microprocessor and a later improved version of the microprocessor. With a classical stack architecture used with a 16-bit earlier family processor, the processor stack pointer would diverge during the code translation process due to a 24 bit program counter used in the: improved version of the microprocessor instead of a 16 bit program counter. Keeping the stack pointers in sync is a key translation requirement to support properly parameter passing through the stack.

Figure 9A:
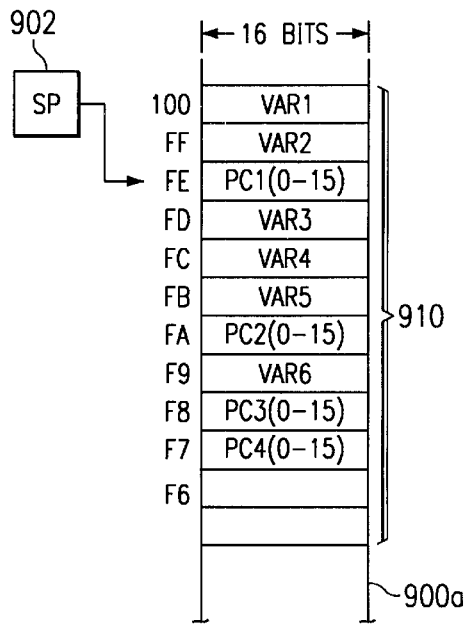
FIG. 9 is a schematic illustration of dual stack regions for storing an expanded program counter, according to aspects of the present invention.
Figure 9B:
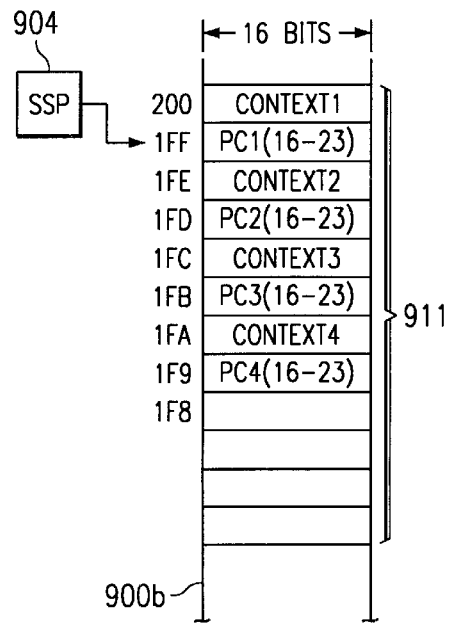
Figure 10:
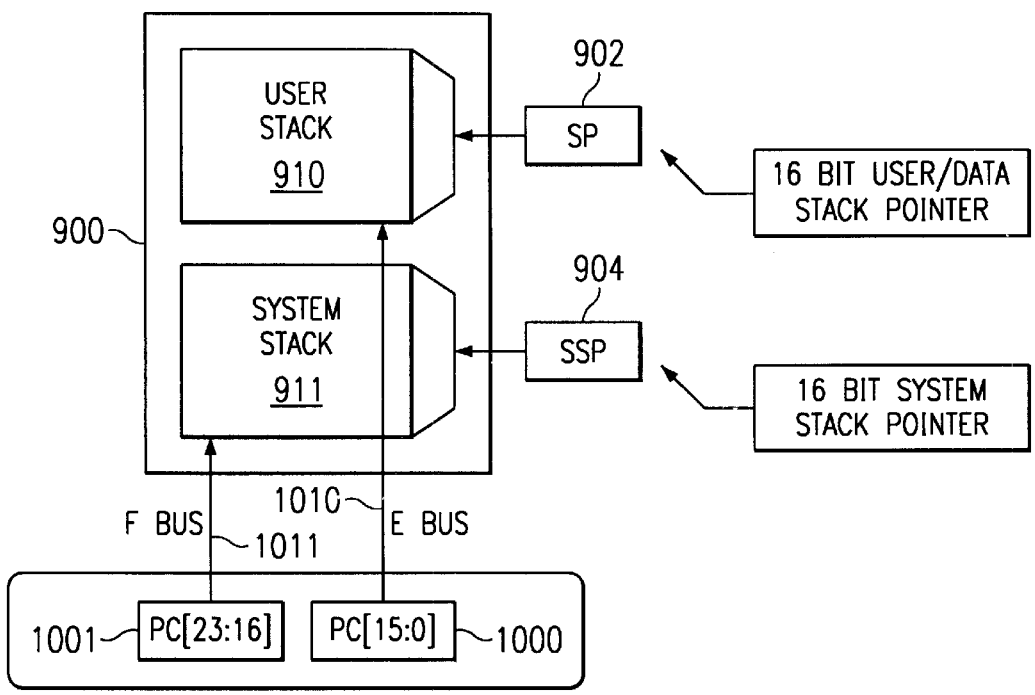
FIG. 10 is a schematic illustration of a user stack region and a system stack region for the microprocessor of FIG. 1, according to aspects of the present invention.

To met the above requirement, according to aspects of the present invention, the processor stack is managed with two independent pointers: user stack pointer SP and system stack pointer SSP, as illustrated in FIGS. 9 and 10. The user should never handle the system stack pointer except for mapping.

Figure 8A:
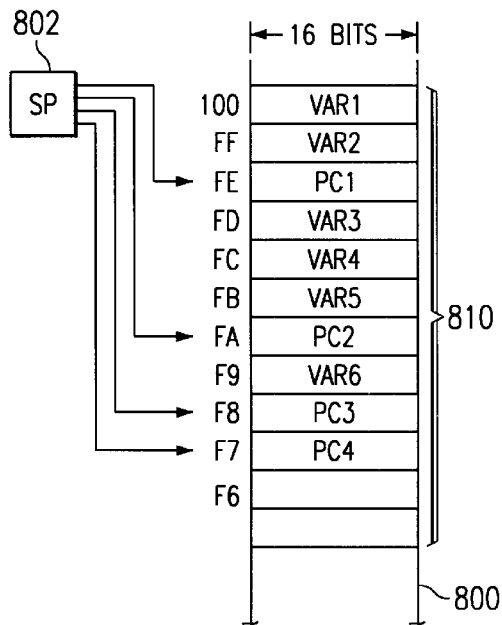
FIG. 8A is a schematic illustration of a stack region used in a prior generation microprocessor.

FIG. 8A is a schematic illustration of a stack region 810 within a memory space 800 used in a prior generation microprocessor. The illustrated stack starts at word address 100, but the stack could start at a different address. A stack pointer 802 contains an address value that "points" to the last stored data location in the stack region. Typically, one or more variables are pushed onto a stack, and then a subroutine is called. A call instruction pushes the value of the program counter onto the stack so that instruction execution can resume at that point after returning from the subroutine. Note that the program counter value is 16 bits, or less, and fits within one 16-bit word in the stack.

Within the subroutine, the variables are accessed using stack pointer relative addressing, as illustrated in the following code sequence:

```
        push (DAx)              ;var1, data address register x
        push (DAy)              ;var2, data address register y
        . . .
        call func_a             ;pushes PC1 onto the stack
        . . .
        . . .
func_a  ACy = ACx + *SP(offset_var1)   ;accumulator y, accumulator x
        ACy = *SP(offset_var2) * ACy
```

In the above code sequence, the term "*SP(offset_var1)" indicates that the data value located at a memory location that is relative to the stack pointer SP by an amount (offset_var1) will be fetched. A compiler calculates the relative address of each variable during the compile process. Referring again to FIG. 8A, the stack pointer will be pointing to address FE after pushing the value of the program counter PC1 in response to executing the "call func_a" instruction. In this case, the stack pointer relative address of the pushed variable VAR1 is 2. Therefore, the compiler inserts "2" in place of "offset_var1." Alternatively, a programmer hand-writes an assembly language program in which the programmer inserts the correct literal offset values for "offset_var1" and "offset_var2."

Referring still to FIG. 8A, it can be seen that different numbers of variables can be pushed onto the stack prior to each call which pushes a program counter value PC2, PC3, PC4. However, in each case, the stack pointer SP is pre-decremented so that it points to the last item pushed on the stack, such as at FA, F8, and F7 respectively.

Figure 8B:
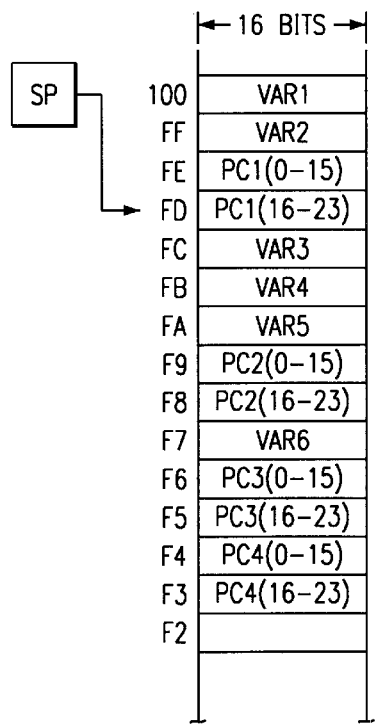
FIG. 8B is a schematic illustration of an example of a stack region for storing an expanded program counter.

FIG. 8B is a schematic illustration of an example of a stack region for storing an expanded program counter. In this case, the program counter has been increased to 24-bits. Now, in order to push a value of the program counter onto the stack, two 16-bit stack word locations are required, as at addresses FE and FD. Thus, if the code segment above that was compiled or hand-written for the prior processor with a stack as illustrated in FIG. 8A is executed on an improved processor having a stack as illustrated in FIG. 8B, then an error will occur when stack pointer relative addressing is used by the subroutine because the original offset values provided by the compiler are now incorrect. Thus, the program must be recompiled, which is a disadvantage. Similarly for the case of hand-written assembly language code. The assembly language program must be laboriously translated by hand since literal offsets supplied by the programmer can't be corrected by an assembler. Even if an assembler provides the offset values, the program must still be re-assembled, which is a disadvantage.

FIG. 9 is schematic illustration of dual stack regions 910, 911 for storing an expanded program counter, according to aspects of the present invention. Both regions are located in a contiguous memory space that includes memory spaces 900a and 900b. Alternatively, memory spaces 900a and 900b could be in non-contiguous memory, or in separate memory spaces. User stack region 910 is used to store variables and a first portion of the program counter such that all stack pointer relative address offsets from an earlier generation processor remain valid. System stack region 911 is used to store the remaining portion of the program counter.

In FIG. 9, the first portion of the program counter contains bits 0–15, while the remaining portion contains bits 16–23 for a 24-bit program counter. However, the program counter could be divided differently, as long as only one word location in the user stack is used to store the first portion of the program counter.

Referring still to FIG. 9, a context value can also be stored in the system stack region, as shown by context1 stored at address 200, for example. The context value provides status information about various functional circuitry in the microprocessor at the time when the program counter was pushed onto the stack. Context values are stored when program flow altering instructions, such as a CALL for example, are executed. Likewise, context values are stored when an interrupt occurs and a program counter values is pushed on the stack in response to the interrupt. The format of the context value will be described in more detail later. Alternatively, context values could be stored only in response to interrupts or only in response to program flow altering instructions. In various embodiments, the context value may be stored in the same word with the most significant portion of the program counter, or in separate words.

The stack is manipulated by the following events:

(1) Interrupts and intr( ), trap( ), and call( ) instructions which push data both in the system and the user stack. SP and SSP are both pre-decremented before storing elements to the stack.

(2) push( ) instructions which pushes data only in the user stack. SP is pre-decremented before storing elements to the stack.

(3) return( ) instructions which pop data both from the system and the user stack. SP and SSP are both post-incremented after stack elements are loaded.

(4) pop( ) instructions which pop data only from the user stack. SP is post-incremented after stack elements are loaded.

The user stack pointer (SP) is also used to access the single data memory operands in direct mode.

FIG. 10 is a schematic illustration of user stack region 910 and system stack region 911 for the microprocessor of FIG. 1, according to further aspects of the present invention. Both stack pointers contain the address of the last element pushed into the user stack. Processor 100 provides a 32-bit path to the stack which allows fast context saving.

Processor 100 takes advantage of the 2×16-bit memory read/write buses and dual read/write access to speed up context saves. For example, a 32-bit accumulator or two independent registers are saved as a sequence of two 16-bit memory writes. The context save routine can mix single and double push( )/pop( ) instructions. The byte format is not supported by the push/pop instructions family. In a context save driven by the program flow (calls, interrupts), the program counter is split into two fields PC[23:16], PC[15:0] and saved as a dual write access. The field PC[15:0] is saved on the user stack at the location pointed to by SP through the EB/EAB buses. The field PC[23:16] is saved on the stack at the location pointed to by SSP through the FB/FAB buses. Table 3 summarizes the Call and Return instructions.

TABLE 3

Call and Return Instructions

| Instructions | FB Request @ SSP-1 | EB Request @ SP-1 | Stack Access |
|---|---|---|---|
| call P24 | PC[23-16] | PC[15-0] | dual write |
| Instructions | CB Request @ SSP | DB request @ SP+1 | Stack Access |
| return | PC[23-16] | PC[15-0] | dual read |

Referring still to FIG. 10, as described earlier, a first portion of the program counter 1000 is stored in the user stack, while the remaining portion of the program counter 1001 is stored in the system stack. As described earlier, memory 900 can be accessed simultaneously via E-bus 1010 and F-bus 1011. Thus, both portions of the program counter 1000, 1001 can be written or read to/from the dual stacks simultaneously so that there is no loss of performance, compared to an earlier microprocessor with only a 16-bit program counter.

To get the best performance during context save, the stack has to be mapped into dual access memory instances. The stack regions are maintained within main data page 0 (64 Kword) in this embodiment. However, other embodiments could place the stack regions in different memory areas. Applications which require a large stack can implement it with two single access memory instances with a special mapping (odd/even bank) to get rid of the conflict between E and F requests.

Stack instructions are summarized in Table 4.

TABLE 4

Stack Referencing Instructions

| Instructions | | EB Request @ SP-1 | Stack Access |
|---|---|---|---|
| Push(DAx) | — | DAx[15-0] | single write |
| Push(ACx) | — | ACx[15-0] | single write |
| Push(Smem) | — | Smem | single write |
| Instructions | FB Request @ SP-2 | EB Request @ SP-1 | Stack Access |
| Dbl(push(ACx)) | ACx[31-16] | ACx[15-0] | dual write |
| Push(dbl(Lmem)) | Lmem[31-16] | Lmem[15-0] | dual write |
| Push(src,Smem) | src | Smem | dual write |
| Push(src1,src2) | src1 | src2 | dual write |
| Instructions | | DB Request @ SP | Stack Access |
| DAx = pop( ) | — | DAx[15-0] | single read |
| ACx = pop( ) | — | ACx[15-0] | single read |
| Smem = pop( ) | — | Smem | single read |
| Instructions | CB Request @ SP | DB Request @ SP + 1 | Stack Access |
| ACx = dbl(pop( )) | ACx[31-16] | ACx[15-0] | dual read |
| Dbl(Lmem) = pop( ) | Lmem[31-16] | Lmem[15-0] | dual read |
| Dst,Smem = pop( ) | dst | Smem | dual read |
| Dst1,dst2 = pop( ) | dst1 | dst2 | dual read |

Depending on the prior generation device original code, the translator may have to deal with "far calls" (24 bit address). Processor 100's instruction set supports a unique class of call/return instructions based on the dual read/dual write scheme. The translated code will execute an SP=SP+K8 instruction in addition to the call to end up with the same SP post modification.

Figure 11:
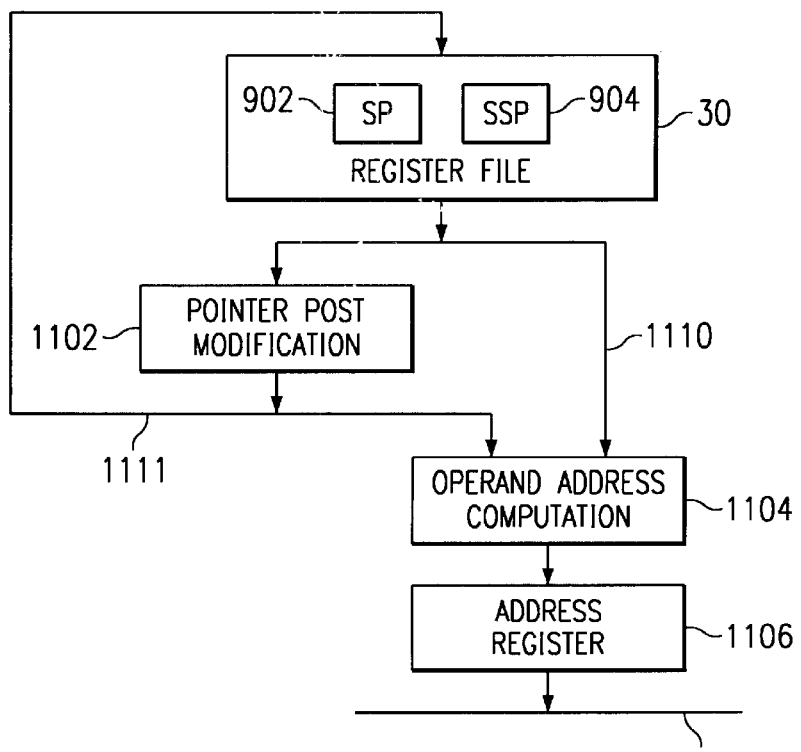
FIG. 11 is a block diagram illustrating address generation in the microprocessor.

There is a limited number of cases where the translation process implies extra CPU resources. If an interrupt is taken within such a macro and if the interrupt routine includes similar macros, then the translated context save sequence will require extra push( ) instructions. That means an earlier family processor and the present processor stack pointers are no longer in synchronization during the ISR execution window. Provided that all the context save is performed at the beginning of the ISR, any parameter passing through the stack within the interrupt task is preserved. Upon return from interrupt, the earlier family processor and the present processor stack pointers are back in synchronization FIG. 11 is a block diagram illustrating address generation in the microprocessor of FIG. 1. Register file 30 holds various registers for microprocessor 100, including user stack pointer 902 and system stack pointer 904. Pointer post modification circuitry 1102 is connected to the register file via bus 1110 and is operable to increment or decrement a selected register by a selected amount. A modified register value is provided to operand address computation circuitry 1104 via bus 1111. Operand address computation circuitry 1104 is operable to modify the value of a selected register in response to the addressing mode of an instruction being executed, such as by adding a stack pointer relative address to the stack pointer, as described earlier. An appropriately modified address value is then stored in address register circuitry 1106 and applied to address bus 1108 in order to access memory. Address bus 1108 is representative of any of address busses 160, 162, 164, 166 or 168 of FIG. 6. The A unit supports 16 bit operations and 8 bit load/store. Most of the address computation is performed by the DAGEN thanks to powerful modifiers. All the pointer registers and associated offset registers are implemented as 16 bit registers. The 16 bit address is then concatenated to the main data page to build a 24 bit memory address.

Figure 12:
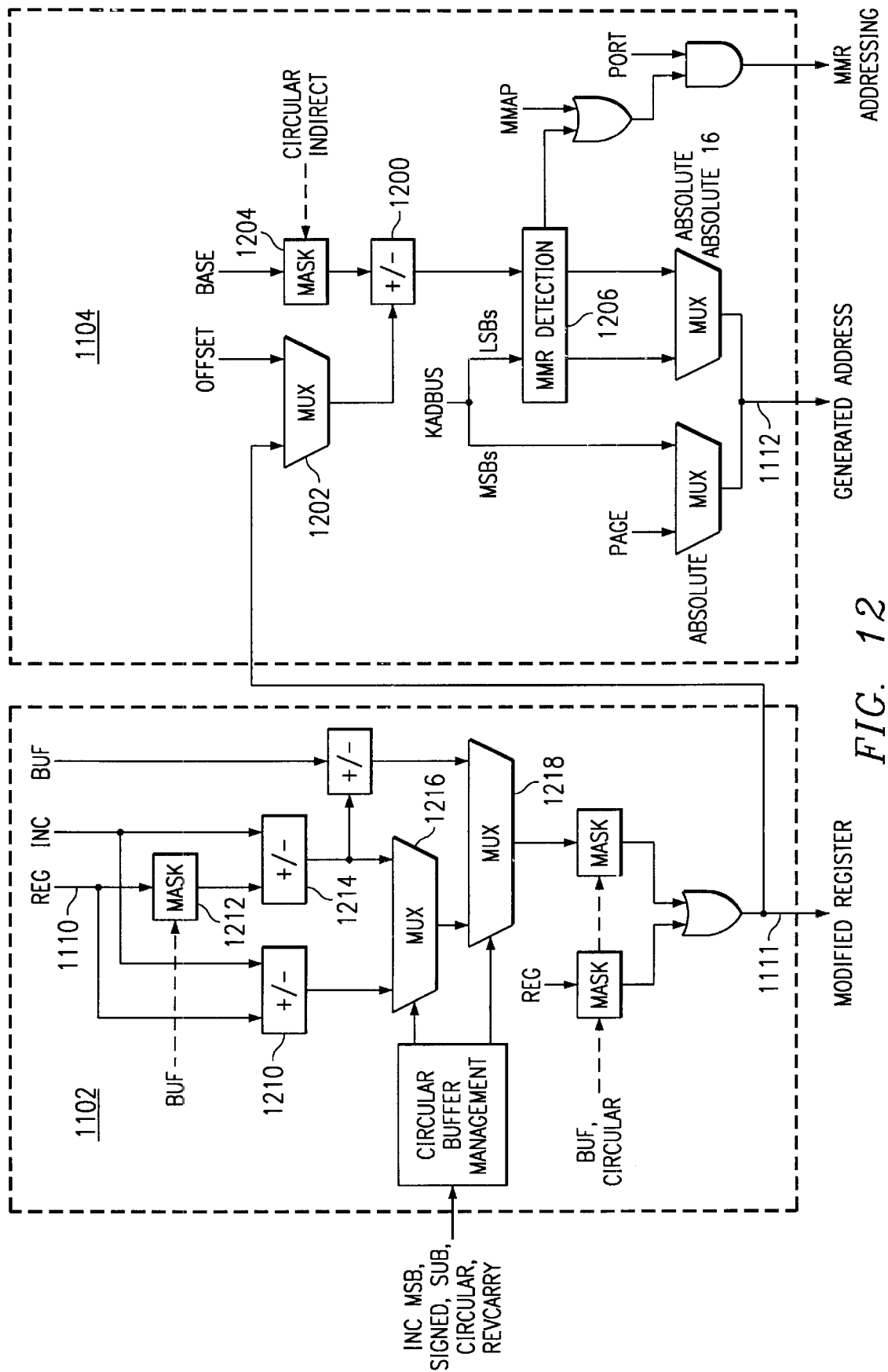
FIG. 12 is a more detailed block diagram of portions of the address generation circuitry of FIG. 11.

FIG. 12 is a more detailed block diagram of portions of the address circuitry of FIG. 11. Address generation is made by computing logical and arithmetical operations (masking, additions and subtractions with or without reverse carry propagation). Selection of the operands is done in the Register File. Address generation is performed in two stages: register modification is performed in modification circuitry 1102, and offset computation is performed in computation circuitry 1104. Direct and absolute addressing don't use register modification (in these cases, register modification result is ignored)

Register modification is controlled by the signals described in Table 5, while Offset modification is controlled by the signals described in Table 6.

TABLE 5

Register Modification Control Signals

| | |
|---|---|
| sub | modifier requires a post- or pre-decrementation of the register. |
| revcarry | modifier implies a reverse propagated carry operation. |
| circular | register modification should be done circularly. |

TABLE 6

Offset Modification is Control Signals

| | |
|---|---|
| indirect | if LOW, address computation doesn't make use of ARx or modified ARx. |
| absolute24 | address is based on a constant, without use of MDP as a page index. |

TABLE 6-continued

Offset Modification is Control Signals

| | |
|---|---|
| absolute | address is based on a constant, with use of MDP as a page index. |
| pm | address is based on the pre-modified register, computed as described earlier. |
| readport/writeport | address is targeted towards peripherals: offset used is PDP, with no paging. |
| mmap | address is targeted towards MMRs (when in direct addressing, for X and Y paths only) |

X, Y and Coefficient paths are very similar. However, the coefficient path is much simpler, since it only supports indirect addressing with a limited set of modifiers (no pre-modify.

Referring still to FIG. 12, operand address computation circuitry 1104 includes adder/subtractor unit 1200 for pre-incrementing/decrementing a register value. Mux 1202 can provide a modified register value via bus 1111 to a first input of adder 1200. Mux 1202 can also provide an offset value from an instruction to the first input of adder 1200. Masker 1204 is connected to a second input of adder 1200 and can select one of the registers from register file. A computed address is examined to determine if it points to a MMR in detection circuitry 1206, and then sent to an address register via bus 1112.

Still referring to FIG. 12, modification circuitry 1102 receives a register value from register file 30 via bus 1110. The register value can be incremented or decremented by adder/subtractor 1210 or masked by masker circuitry 1212 and then incremented/decremented by adder/subtractor 1214. Multiplexors 1216 and 1218 route the modified value to bus 1111 for updating the register file 30 and for sending to address computation circuitry 1104.

FIG. 13 is a block diagram illustrating only the paths through modification circuitry 1102 and computation circuitry 1104 for providing the stack pointer and the system stack pointer simultaneously to two data busses for dual read or write transactions, according to an aspect of the present invention. In addition to pre-incrementation/decrementation as discussed above, post modification circuitry 1102 can increment or decrement stack pointer SP. Mux 1300 selects either the user stack pointer SP via signal 1221 or system stack pointer SSP via signal 1220 and loads an address register on either the C-bus or E-bus via bus 1310. Likewise, mux 1301 selects either the user stack pointer SP or system stack pointer SSP and loads an address register on either the D-bus or F-bus via bus 1311.

Figure 14:
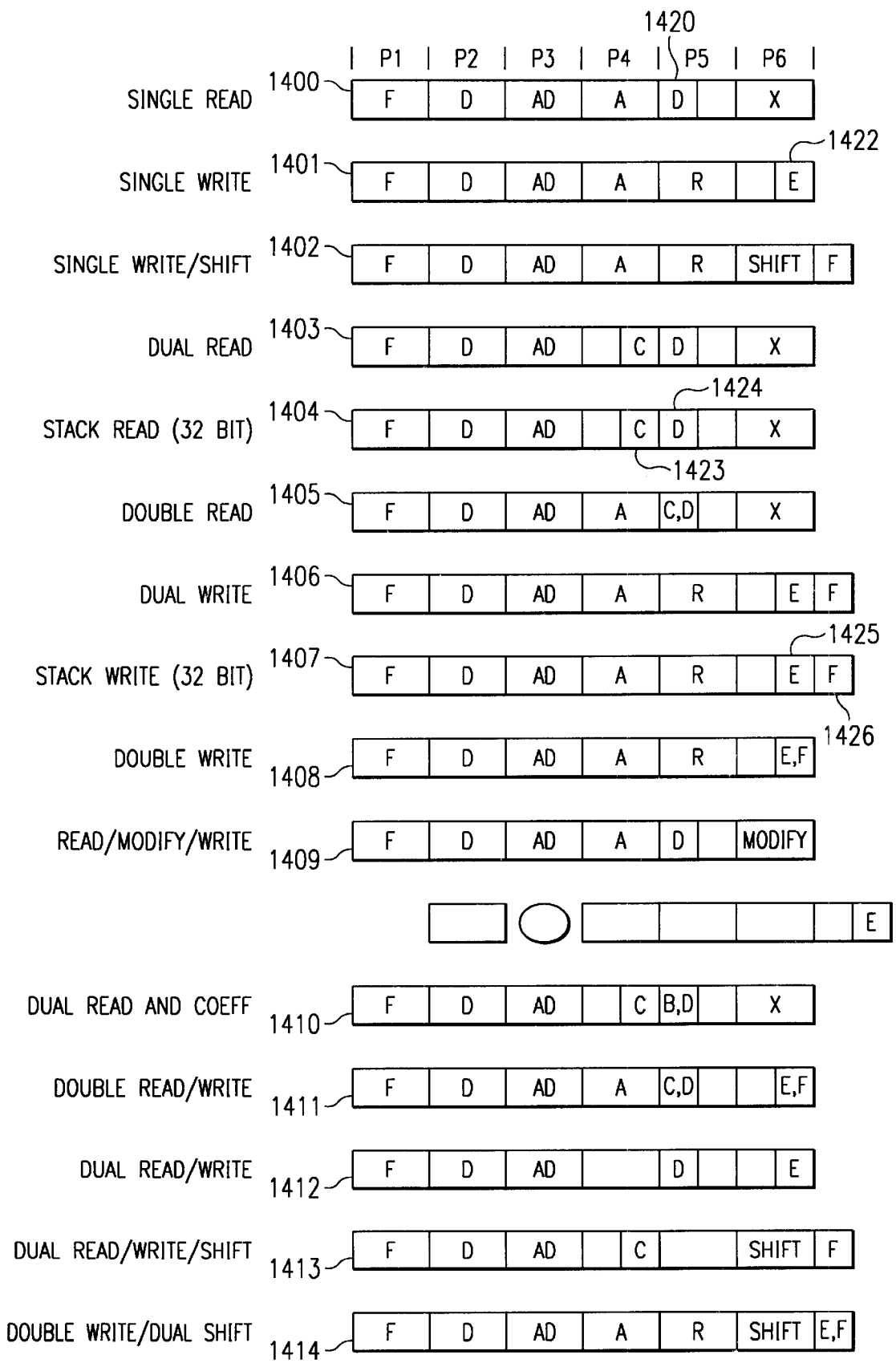
FIG. 14 is a timing diagram illustrating single and dual read and write transactions within the microprocessor.

FIG. 14 is a timing diagram illustrating single and dual read and write transactions within the pipeline of microprocessor 100. This figure illustrates various memory read/write transactions using either the C-bus and D-bus for reads or the E-bus and F-bus for writes. As discussed earlier, the pipeline has seven stages, but only stages P1–P6 are illustrated here. Each timeline 1400–1414 represents a single clock cycle in the pipeline and indicates when various memory transactions occur. Timeline 1400 illustrate a single read cycle which occurs in the read stage P5 using the D-bus. Note that during read stage P5, memory reads are performed during the first half of the cycle, indicated by time slot 1420. Timeline 1401 illustrates a single write transaction which occurs in the execute stage P6 at slot 1422.

Timeline 1404 illustrates reading both the user stack and the system stack in the same cycle using stack pointer SP and system stack pointer SSP, as discussed, above. One of the stacks is read from data memory 151 using the C-bus during the last half of access stage P4 at time slot 1423. The other stack is read from data memory 151 using the D-bus during the first half of read stage P5 at time slot 1424. Advantageously, using the address circuitry of described with reference to FIG. 13, either stack can be read in either pipeline stage. However, in a different embodiment, the address circuitry may be implemented in a simpler manner which may not provide this flexibility.

Timeline 1407 illustrates writing reading both the user stack and the system stack in the same cycle using stack pointer SP and system stack pointer SSP, as discussed above. One of the stacks is written to data memory 151 using the E-bus during the last half of execute stage P6 at time slot 1425. The other stack is written to data memory 151 using the F-bus during the first half of the following execute stage P6 at time slot 1426. Advantageously, using the address circuitry of described with reference to FIG. 13, either stack can be written in either pipeline stage. However, in a different embodiment, the address circuitry may be implemented in a simpler manner which may not provide this flexibility.

Timeline 1402 illustrates a single write with a shift. Timeline 1403 illustrates a dual read transaction. Timeline 1405 illustrates a double read transaction. Timeline 1406 illustrates a dual write transaction. Timeline 1408 illustrates a double write transaction. Timeline 1409 illustrates a read/modify/write transaction. Timeline 1410 illustrates a dual read and a coefficient read. Timeline 1411 illustrates a double read/write transaction. Timeline 1412 illustrates a dual read/write transaction. Timeline 1413 illustrates a dual read/write with a shift. Timeline 1414 illustrates a double write with a dual shift. Various embodiments of the present invention could perform stack accesses using various types of memory transactions as illustrated by timelines 1400–1414, for example.

FIG. 15 is a chart illustrating context data that is stored in the system stack. Advantageously, additional information can be stored in the system stack while maintaining software compatibility with prior generation processors, since the user stack is not affected by information stored in the system stack. The definitions given in Table 7 explain the fields in this figure.

TABLE 7

Context Information Saved on the System Stack

| | | |
|---|---|---|
| IRD | 0 | Delayed Instruction |
| | 1 | Delayed slot 2 |
| | 2 | Delayed slot 1 |
| LEVEL | 0 | No Repeat Block |
| | 1 | One Level Of Repeat Block is Active |
| | 2 | Two Level Of Repeat Block are Active |
| RPTB1 | 0 | Repeat Block of Level 1 is not Active |
| | 1 | Repeat Block Of Level 1 is Active |
| RPTB2 | 0 | Repeat Block of Level 2 is not Active |
| | 1 | Repeat Block Of Level 2 is Active |
| LOC1 | 0 | Repeat Block of Level 1 is External |
| | 1 | Repeat Block of Level 1 is Internal |
| LOC2 | 0 | Repeat Block of Level 2 is External |
| | 1 | Repeat Block of Level 2 is Internal |
| RPT | 0 | Repeat Single is not Active |
| | 1 | Repeat Single is Active |
| RPTX | 0 | RPTX Instruction is not active |
| | 1 | RPTX is Active |
| LCPRC | | Local Copy of Program Pointer which has to be saved. |

FIG. 16 is a schematic representation of an integrated circuit 40 incorporating processor 100. As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

FIG. 17 illustrates an exemplary implementation of an example of such an integrated circuit 40 in a mobile telecommunications device, such as a mobile telephone 15 with integrated keyboard 12 and display 14. As shown in FIG. 17, the digital system 10 with processor 100 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of data processing device 100 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

An alternative embodiment of the present invention may have a memory mapped register mapping in which the SP and SSP are mapped at consecutive addresses. This allows saving the SP and SSP as a single atomic transfer so that an interrupt does not occur in between.

An alternative embodiment of the present invention may insure that an non-maskable interrupt (NMI) can't be taken before SP,SSP initialization from the User software. This is done by first initializing SP,SSP by hardware to a predetermined "junk address" such as "05Fh". A NMI can be taken only after the SP & SSP contents have been changed by a user program to be different than 05Fh.

Thus, there has been described a processor that is a programmable digital signal processor (DSP), offering both high code density and easy programming. Architecture and instruction set are optimized for low power consumption and high efficiency execution of DSP algorithms, such as for wireless telephones, as well as pure control tasks. The processor includes an instruction buffer unit, and a data computation unit for executing the instructions decoded by the instruction buffer unit. A program counter, which has a lower program counter portion and an upper program counter portion, provides an instruction address that is provided to the instruction memory. A first stack pointer is operable to address a first stack region in a data memory for saving a lower program counter value in response to an instruction, for example a CALL instruction, being executed by the microprocessor. A second stack pointer is operable to address a second stack region in the data memory for saving an upper program counter value in response to executing the CALL instruction. Advantageously, this preserves software code compatibility from an earlier generation microprocessor that passes variables via a stack.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system comprising a microprocessor, wherein the microprocessor comprises:

an instruction buffer unit operable to fetch and decode instructions fetched from an instruction memory;

a data computation unit for executing the instructions decoded by the instruction buffer unit;

a program counter which has a first program counter portion and a remaining program counter portion, the program counter operable to provide an instruction address that is provided to the instruction memory;

a first stack pointer operable to address a first stack region in a data memory for saving a first value representative of the first program counter portion in response to a first instruction being executed by the microprocessor; and a second stack pointer operable to address a second stack region in the data memory for saving a second value representative of the remaining program counter portion in response to executing said first instruction.

2. The digital system of claim 1, wherein the data computation unit is operable to store a first variable value in the first stack region adjacent to the first program counter value using a first stack pointer relative address relative to the first stack pointer in response to executing a second instruction, such that the first stack pointer relative address is not affected by the second program counter value that is stored in the second stack region.

3. The digital system of claim 2, further comprising an instruction memory connected to the instruction buffer for holding a plurality of instructions and a data memory connected to the data computation unit for holding the first stack region and the second stack region.

4. The digital system of claim 1 being a cellular telephone, further comprising:

an integrated keyboard (12) connected to the processor via a keyboard adapter;

a display (14), connected to the processor via a display adapter;

radio frequency (RF) circuitry (16) connected to the processor; and an aerial (18) connected to the RF circuitry.

5. A method of operating a digital system, comprising the steps of:

executing a plurality of instructions in a processor core, wherein the instructions are fetched in response to a program counter from an instruction memory associated with the processor core;

forming a first stack region for holding a plurality of data values in a data memory associated with the processor core by maintaining a first stack pointer;

forming a second stack region separate from the first stack region in the data memory for storing a second plurality of data values by maintaining a second stack pointer;

storing a first value representative of a first portion of a program counter in the first stack region in response to a first instruction being executed in the processor core; and storing a second value representative of a remaining portion of the program counter in the second stack region in response to executing said first instruction.

6. The method of claim 5, further comprising the step of storing a first argument value in the first stack region adjacent to the first program counter value using a first stack pointer relative address relative to the first stack pointer in response to executing a second instruction, such that the first stack pointer relative address is not affected by the second program counter value that is stored in the second stack region.

7. The method of claim 5, further comprising the step of storing a context data value adjacent to the second program counter value using a second stack pointer relative address relative to the second stack pointer in response to executing the second instruction, such that a stack pointer relative address relative to the first stack pointer is not affected by the context data value that is stored in the second stack region.

8. The method according to claim 5, further comprising the step of storing a context data value adjacent to the second program counter value using a second stack pointer relative address relative to the second stack pointer in response to executing an interrupt, such that a stack pointer relative address relative to the first stack pointer is not affected by the context data value that is stored in the second stack region.

9. The method of claim 5, further comprising the steps of:

storing a first argument value in the first stack region adjacent to the first program counter value using a first stack pointer relative address relative to the first stack pointer in response to executing a second instruction, such that the first stack pointer relative address is not affected by the second program counter value that is stored in the second stack region;

storing a context data value adjacent to the second program counter value using a second stack pointer relative address relative to the second stack pointer in response to executing the second instruction, such that a stack pointer relative address relative to the first stack pointer is not affected by the context data value that is stored in the second stack region; and storing a context data value adjacent to the second program counter value using a second stack pointer relative address relative to the second stack pointer in response to executing an interrupt, such that a stack pointer relative address relative to the first stack pointer is not affected by the context data value that is stored in the second stack region.

* * * * *